United States Patent

Torimura

[11] Patent Number: 6,062,867
[45] Date of Patent: May 16, 2000

[54] LYRICS DISPLAY APPARATUS

[75] Inventor: Hiroyuki Torimura, Hamamatsu, Japan

[73] Assignee: Yamaha Corporation, Hamamatsu, Japan

[21] Appl. No.: 08/722,838

[22] Filed: Sep. 27, 1996

[30] Foreign Application Priority Data

Sep. 29, 1995 [JP] Japan ................................ 7-276693
Oct. 23, 1995 [JP] Japan ................................ 7-298944

[51] Int. Cl.$^7$ .............................. G09B 5/00; G09B 15/04
[52] U.S. Cl. .............................. 434/307 A; 434/307 R; 84/477 R; 84/609; 348/589; 345/302
[58] Field of Search ............... 434/118, 307 R–309, 434/318, 365; 84/477 R, 601–604, 609–613, 634–637, 644, 650, 652, 662; 348/473, 488, 552–554, 589, 595, 723; 345/141, 143, 147, 302; 386/69, 105, 106; 360/32, 33.01, 72.2; 369/1, 4

[56] References Cited

U.S. PATENT DOCUMENTS

| | | | |
|---|---|---|---|
| 5,131,311 | 7/1992 | Murakami et al. | 434/307 A |
| 5,194,682 | 3/1993 | Okamura et al. | 434/307 A |
| 5,336,844 | 8/1994 | Yamauchi et al. | 84/602 |
| 5,453,570 | 9/1995 | Umeda et al. | 84/477 R X |
| 5,494,443 | 2/1996 | Nakai et al. | 434/307 A |
| 5,499,921 | 3/1996 | Sone . | |
| 5,499,922 | 3/1996 | Umeda et al. | 434/307 A |
| 5,526,284 | 6/1996 | Mankovitz | 455/66 |
| 5,621,182 | 4/1997 | Matsumoto | 64/610 |
| 5,649,234 | 7/1997 | Klappert et al. | 345/302 |
| 5,654,516 | 8/1997 | Tashiro et al. | 84/610 |
| 5,747,715 | 5/1998 | Ohta et al. | 84/609 |
| 5,770,811 | 6/1998 | Haino | 434/307 A X |
| 5,803,747 | 9/1998 | Sone et al. | 434/307 R X |
| 5,808,223 | 9/1998 | Kurakake et al. | 81/609 |

FOREIGN PATENT DOCUMENTS 05224587 9/1993 Japan .
06130981 5/1994 Japan .

*Primary Examiner*—Joe H. Cheng
*Attorney, Agent, or Firm*—Graham & James LLP

[57] ABSTRACT

A lyrics display apparatus wherein a display condition of the words of a song on a display device is gradually changed in accordance with a progression of a piece of music, the display condition of the song words is started to change on a basis of a memorized production timing data of each of the song words and changed in a predetermined amount at a predetermined time interval.

10 Claims, 12 Drawing Sheets

| | |
|---|---|
| TIME DATA | TD1 |
| PERFORMANCE EVENT DATA | PE1 |
| TIME DATA | TD2 |
| LYRICS EVENT DATA | LE1 |
| TIME DATA | TD2 |
| PERFORMANCE EVENT DATA | PE2 |
| TIME DATA | TD3 |
| LYRICS EVENT DATA | LE2 |
| . . . | |

LYRICS BUFFER

| DELAY TIME | LILYICS |
|---|---|
| 40 | い |
| 15 | あ |
| : | |

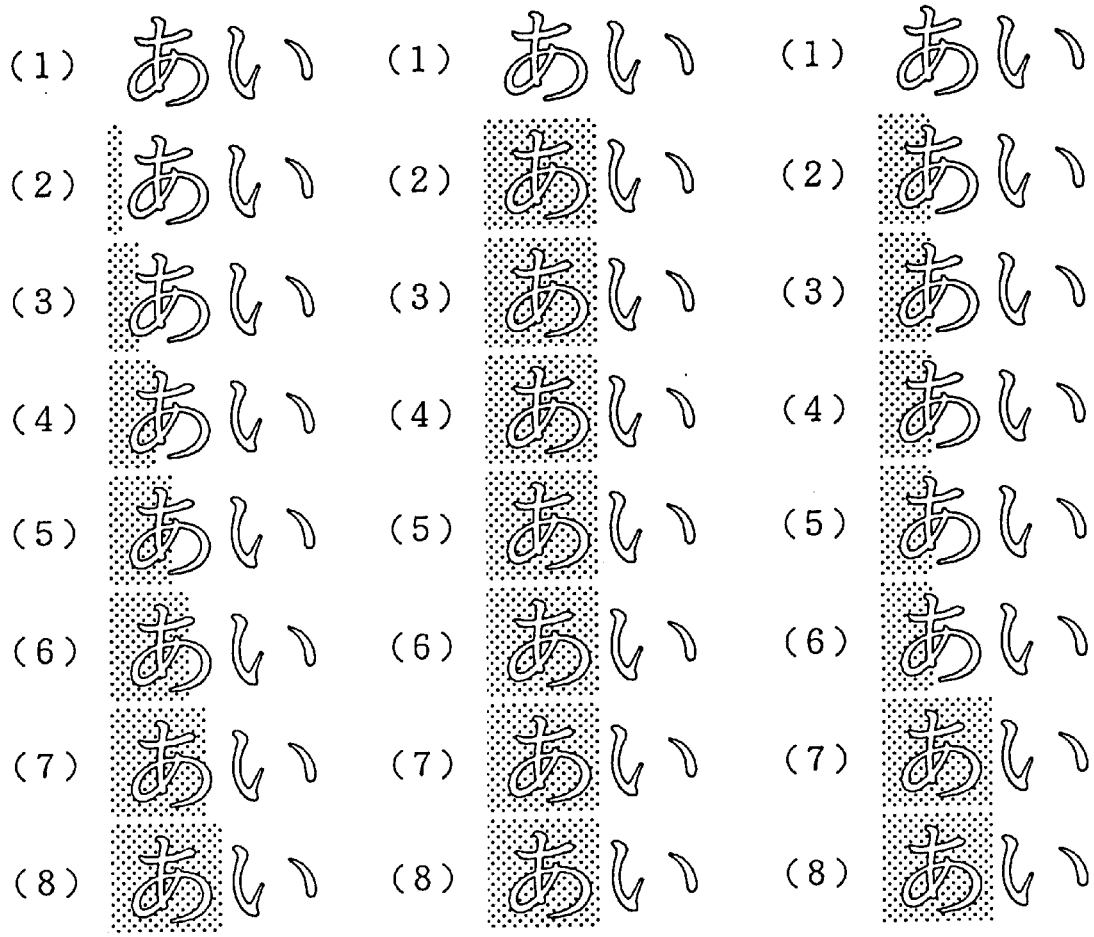

LYRICS DISPLAY APPARATUS

BACKGROUND OF THE INVENTION

1. Field of the Invention

The present invention relates to a lyrics display apparatus adapted for use in Karaoke systems or the like, and more particularly to a lyrics display apparatus capable of displaying a progress position of a piece of music by successively changing a display condition of the words of a song such as the background of the song words.

2. Description of the Prior Art

In a conventional lyrics display apparatus adapted for use in Karaoke systems, a lyrics data indicative of contents to be displayed and a timing data for display of the lyrics data are memorized in accordance with progression of a piece of music to successively display the words of a song based on the timing data. There has been also proposed a lyrics display apparatus capable of displaying a progress position of a piece of music by changing the background color of the words of a song.

For example, Japanese Patent Laid-open Publication No. 6(1994)-130981 discloses a lyrics display apparatus wherein a start data for change of the background color in display of the words of a song and a change speed data of the background color are memorized to gradually change the background color of the words of the song at a speed defined by the change speed data thereby to display a progress position of a piece of music and to smoothly change the background color.

In the conventional lyrics display apparatus, however, a large capacity memory is required to provide the start data and change speed data of the background color at each word of the song for displaying a progress position of the piece of music.

SUMMARY OF THE INVENTION

It is, therefore, an object of the present invention to provide a lyrics display apparatus capable of smoothly changing a display condition of the words of a song with a small amount of data.

Another object of the present invention is to provide a lyrics display apparatus capable of displaying a production timing and a progress position of a piece of music without delay of a time.

According to the present invention, there is provided a lyrics display apparatus which comprises memory means for memorizing the words of a song and a production timing data of each of the song words, display means for displaying the words of the memorized song thereon, wipe means for gradually changing a display condition of the song words on the display means in accordance with a progression of a piece of music, and means for starting change of the display condition of the song words on a basis of the production timing data and for changing the display condition of the song word in a predetermined amount at a predetermined time interval.

According to an aspect of the present invention, there is provided a lyrics display apparatus which comprises memory means for memorizing tho words of a song and a production timing data of each of the song words, display means for displaying the words of the memorized song thereon, processing means for control of the production timing data of each of the song words, wipe means for changing the display condition of the song words on the display means in accordance with a progression of a piece of music at a timing defined by the production timing data under control of the processing means and control means for controlling a change of the display condition of the song words on the display means in accordance with the processing ability of said processing means.

According to another aspect of the present invention, there is provided a lyrics display apparatus which comprises memory means for memorizing the words of a song, a production timing data of each of the song words and a performance data corresponding with the production timing, display means for displaying the words of the memorized song thereon, musical tone production means for producing a musical tone waveform signal based on the memorized performance data, indication means for indicating a progress position of the song words displayed on the display means based on each production timing data of the song word, and delay means for delaying the indication of the progress position of the song words with a predetermined period of time corresponding with a time required for production of the musical tone waveform signal.

BRIEF DESCRIPTION OF THE DRAWINGS

Other objects, features and advantages of the present invention will be more readily appreciated from the following detailed description of preferred embodiments thereof when taken together with the accompanying drawings, in which:

FIG. 16 illustrates examples of display of the words of a song in the second and third embodiments.

DESCRIPTION OF THE PREFERRED EMBODIMENTS

Figure 1A:
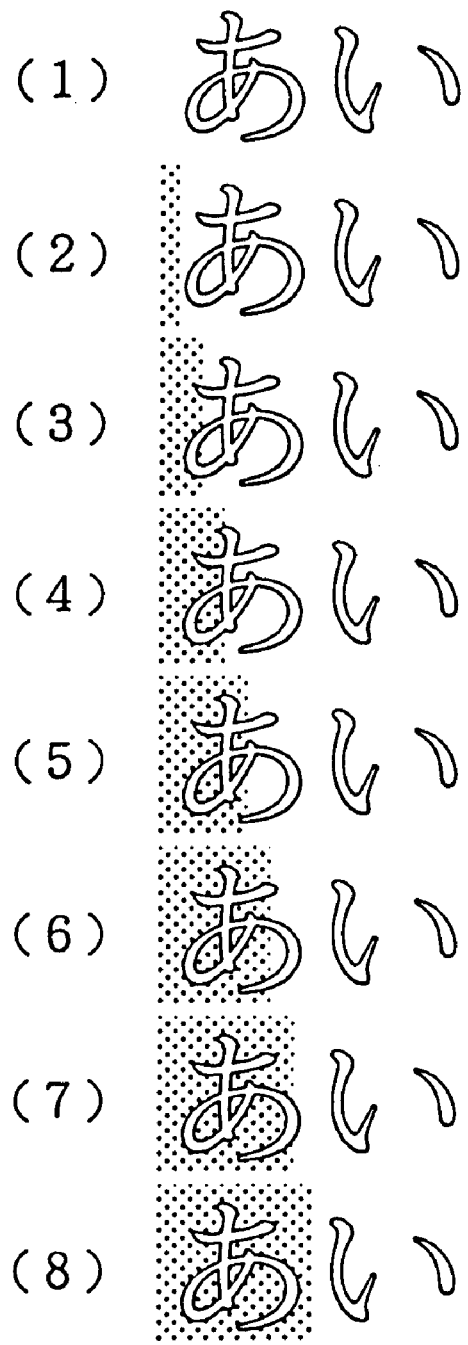
FIGS. 1(A) and 1(B) illustrate examples of display of the words of a song in a first embodiment of the present invention.
Figure 1B:
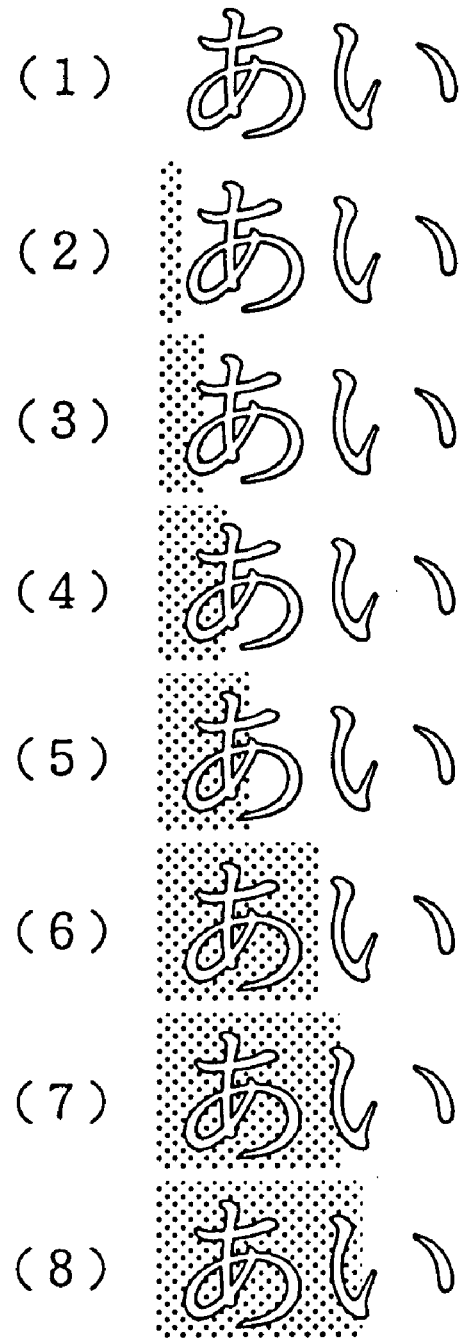

Illustrated in FIG. 1 of the drawings is an example of the words of a song visually indicated by a lyrics display apparatus in accordance with the present invention. To display a progress position of a piece of music, there are various display methods such as for changing a display color of the words of a song and background of the words, for changing a pattern fading out the song words and background thereof, for changing the kind and size of a font of the words of a song, or for underlining the words of a song. In this embodiment, a method for changing the background color of the words of a song will be described hereinafter. In FIGS. 1(A) and 1(B), a change of the background color is being displayed by a meshed part behind the words of a song. In FIGS. 1(A) and 1(B), there are Illustrated each condition where the background color changes from the left to the right in accordance with progression of a piece of music. Illustrated in FIG. 1(A) are a condition (1) where the background color does not start to change, conditions (2)–(7) where the background color of first word of the song changes in a constant amount at each lapse of a predetermined time and a condition (8) where change of the word finishes. (Hereinafter, gradual change of the background color is called "Wipe")

In FIG. 1(B) there are Illustrated the same conditions (1)–(5) as in FIG. 1(A), a condition (6) where the unchanged part of the background color is immediately changed and conditions (7)–(8) where wipe of the background color of the following word is started. That is to say, in a condition where performance of the piece of music is advanced to the following word at the time when wipe of the background color has been advanced to the condition (8), wipe of the background color is forcibly transferred to the following word to prevent change of the background color from delay in progression of the performance and to avoid progression of the performance without change of the background color. If a progress position of the performance does not arrive at the following word after wipe of the preceding word, wipe of the background color is interrupted until the performance of the piece of music is advanced to the following word.

Figure 2:
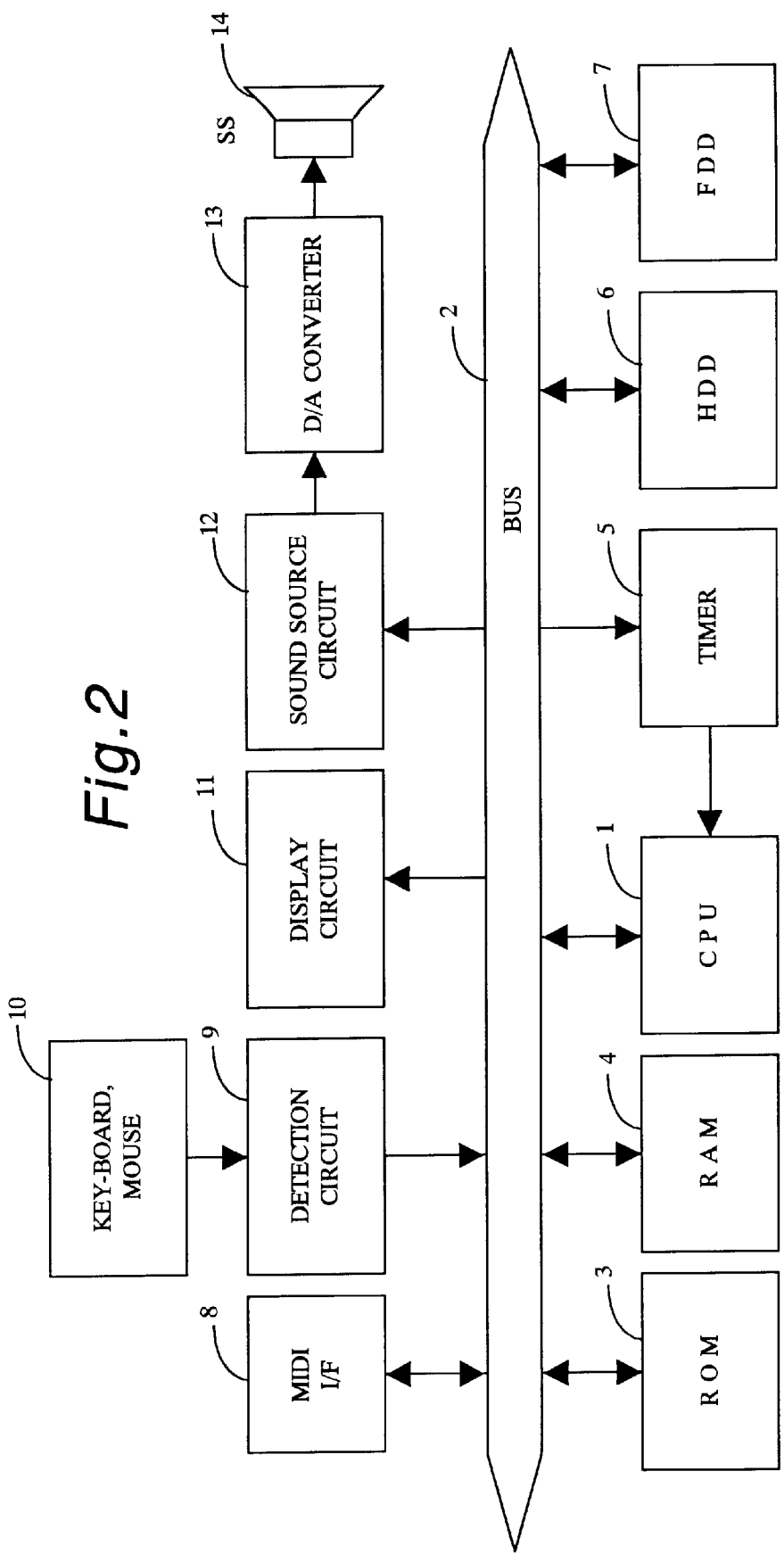
FIG. 2 is a block diagram of a lyrics display apparatus in the first embodiment.

In FIG. 2 there is schematically illustrated the construction of the lyrics display apparatus which includes a central processing unit or CPU 1 to execute a control program stored in a read-only memory or ROM 3. The CPU 1 is connected to other component parts of the display apparatus through a bus line 2. A random access memory or RAM 4 is provided with memory regions such as a buffer, a register or the like for temporarily memorizing various data produced by the CPU 1 and memory regions for memorizing performance data for a Karaoke system applied from a hard disk or HDD 6 and a floppy disk or FDD 7. The performance data includes an event data for performing an accompaniment of the Karaoke system and an event data for displaying the words of a song. A timer 5 is provided to supply an interruption signal at a predetermined frequency to the CPU 1. The performance data memorized in the RAM 4 is read out by interruption processing of the CPU 1 at the predetermined frequency.

A musical instrument digital interface or MIDI 8 is provided to store the performance data applied from an external device into the HDD 6 or the like. An operation element 10 is in the form of a keyboard or a mouse adapted to designate start/stop of the performance and other various kinds of functions. A detection circuit 9 is provided to detect an operational information data indicative of functions designated by the operation element and to apply the operational information data to the CPU 1. A display circuit 11 is in the form of a color liquid crystal display or CRT which is arranged to display the words of a song for the Karaoke system as shown in FIGS. 1(A) and 1(B).

A sound source circuit 12 is provided to produce a musical tone waveform signal based on the performance event data supplied from the MIDI 8. The sound source circuit 12 is in the form of a conventional waveform memory system, a frequency modulation system, a physical mode simulation system, a higher harmonic synthesis system, a formant synthesis system, an analog synthesis system in the combination of an oscillator and a filter, or the like. The musical tone waveform signal produced by the sound source circuit 12 is converted by a digital-to-analog or D/A converter 13 into an analog musical tone waveform signal and generated as a sound in a sound system 14. Alternatively, the sound source circuit 12 may be comprised of a combination of a digital signal processor or DSP and a microprogram or a combination of the CPU and a software program. In addition, the sound source circuit may comprise a plurality of sound channels formed by time divisional use of a single circuit or a single channel comprised of a single circuit. The sound source circuit may be connected to an external device by means of a communication system such as various networks.

Figures 3, 6:
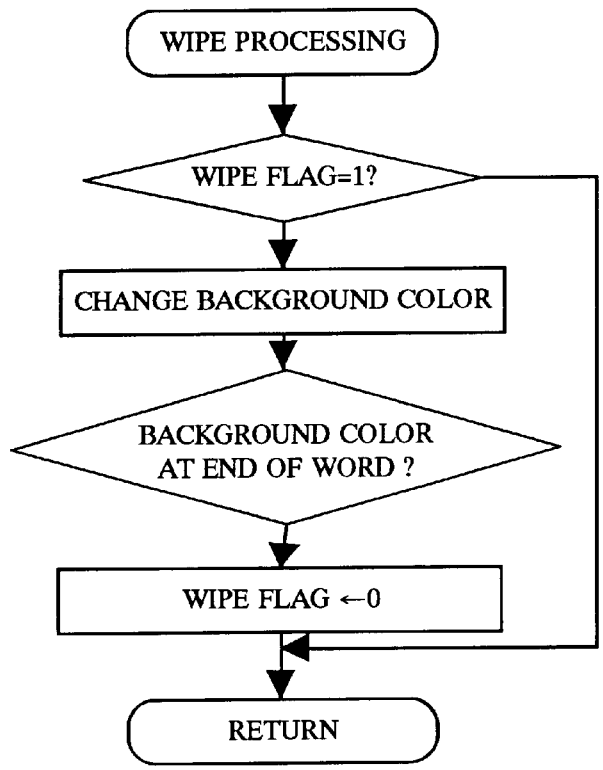
FIG. 3 is a memory format of a performance event in the first embodiment.
FIG. 6 is a flow chart of a program for wipe processing in the first embodiment.

Illustrated in FIG. 3 is a memory format of the performance data memorized in the RAM 4, for example, in the form of a standard MIDI file or SMF. In FIG. 3, a portion of contents of a track in the SMF. In the memory format, time data TD1, TD2, . . . . each represent an event data and a production time interval of the following event data wherein a predetermined note length (for example, 382th note) is represented as a unit. Performance event data PE1, PF2, . . . . each consist of a note-on or note-off event, a pitch event, various kinds of control data such as tone volume control for performing an accompaniment of the Karaoke system. The note-on or note-off event includes a key-code data indicative of tone pitch of a sound or mute tone. The performance event data includes performance data of plural parts such a drum part, a bass part, a chord backing part, a melody part, etc. The plural parts each are identified by a channel number included in each performance event data.

Lyrics event data LE1, LE2, . . . . each are in the form of a word data for display of the words of a song in the Karaoke system. In this embodiment, one of lyrics event data corresponds with one of the words of a song, and each song event is memorized in pair with performance data of the corresponding melody. For example, a word represented by the song event data LE1 corresponds with a note represented by the performance event data PE1, and the time data TD2 between the two event data is set as "0" to simultaneously produce the two events. The memory format of the performance data may be in the form of a combination of an event and an absolute time, a combination of a tone pitch and a note length or the like. The memory format may be memorized in separate memory regions in such a manner as to determine each production timing of the song words. The performance data may be also memorized in such a manner that the data of the plural parts are divided at each track.

Figure 4:
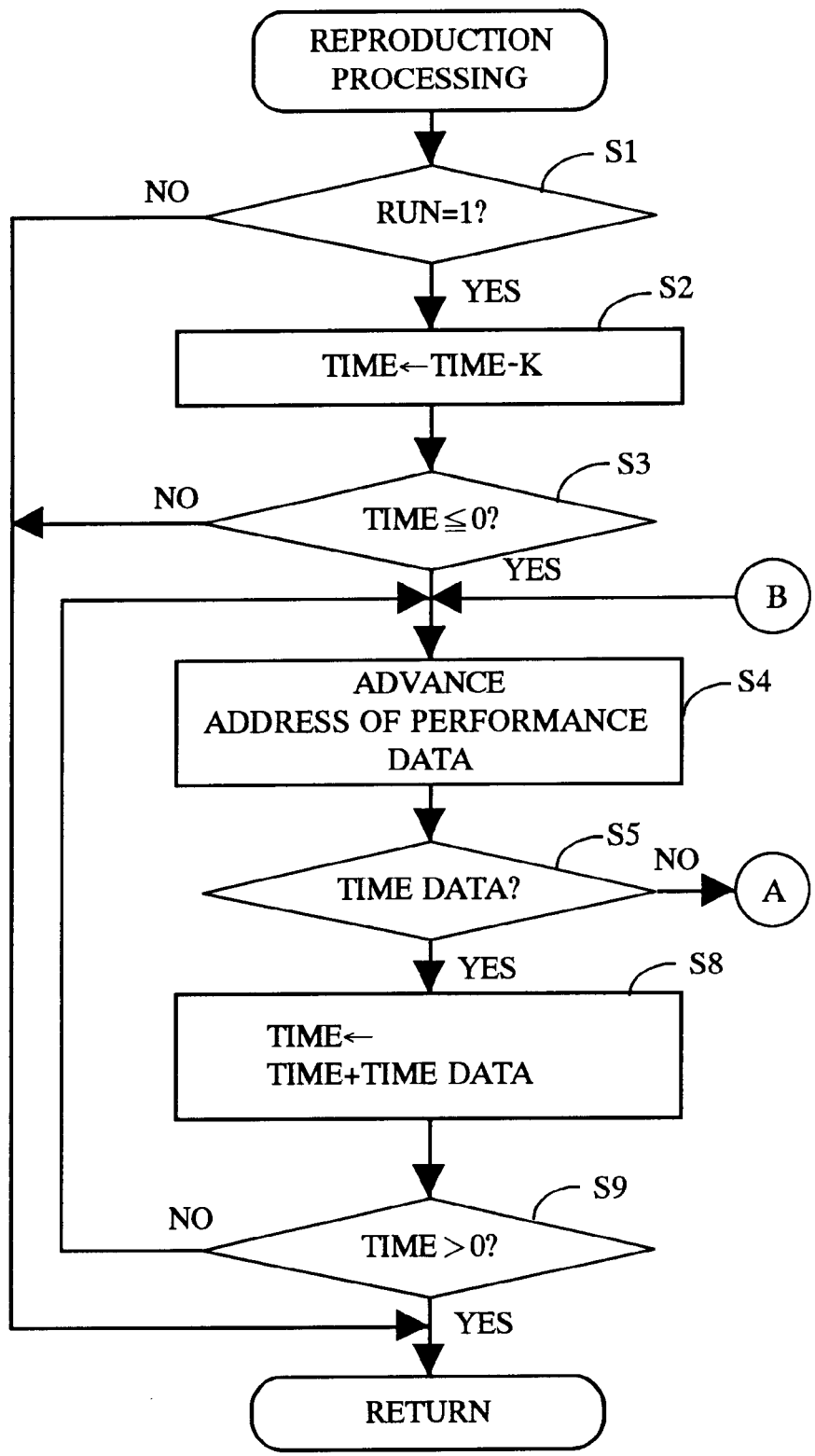
FIG. 4 is a flow chart of the first part of a program for reproduction processing in the first embodiment.
Figure 5:
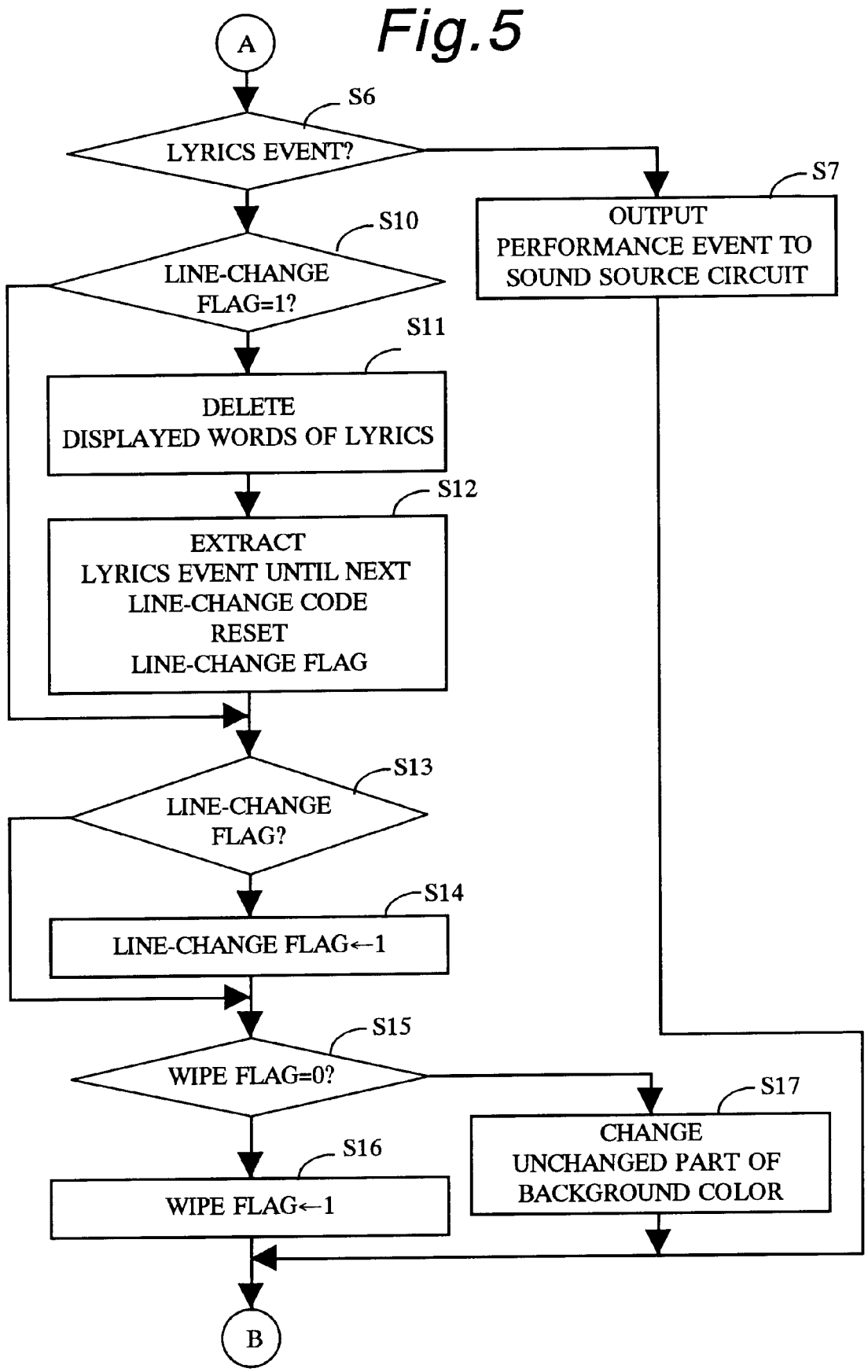
FIG. 5 is a flow chart of the second part of the program for reproduction processing.

Illustrated in FIGS. 4 and 5 is a program for reproduction processing executed by the CPU 1 in response to an interruption signal applied from the timer 5 upon each lapse of 10 ms. When a flag RUN is set as "1" by a performance start instruction, the CPU 1 determines a "Yes" answer at step s1 and executes processing for performance of the accompaniment of the Karaoke system and processing for display of the words of a song. When determined a "No" answer at step s1, the CPU 1 returns the program to a main routine. At step s2, the CPU 1 subtracts a predetermined value K from a register TIME storing the time data. The predetermined value K corresponds with the length of a unit note to be advanced at the time interval 10 ms of the reproduction processing and is represented by an equation K=(tempo× resolution×interruption duration)/(60×1000), where the tempo is the number of quarter notes performed in one minute, the resolution is represented by the number of quarter notes in the time data of the performance data. Assuming that a 384th note is described as a unit of the time data, the resolution becomes 96 since the 384th note is divided by a quarter note into 96. The interruption period is a generation period of the interruption signal for execution of the reproduction processing. In this embodiment, the interruption period is determined as 10 ms. If the tempo, resolution and interruption period are defined by "120", "96" and "10" respectively, the value of K becomes 1.92 so that the time data is advanced by 1.92 when the reproduction processing is once executed. Assuming that the value of the time data was 192 (=the length of a half note), the performance is advanced by the half note when the reproduction processing is executed one hundred times. In addition, the first time data in the performance data is set as an initial value of the register TIME by processing responsive to the performance start instruction.

When the value of the register TIME becomes less than "0", the CPU 1 determines a "Yes" answer at step s3 and advances the address of the performance data at step s4 to read out a data therefrom. At the following step s5, the CPU 1 determines whether the read out data is the time data or not. Since a head time data is previously read out at start of the performance, the CPU 1 reads out the following event data from the time data at step s4 and determines a "No" answer at step s5. When the program proceeds to step s6 of FIG. 5, the CPU1 determines whether the read out data is a lyrics event data or not. If the read out data is the performance event data, the CPU 1 determines a "No" answer at step s6 and applies at step s7 the performance event data to the sound source circuit 12 to effect generation or mute of the accompaniment tone. If the read out data is the lyrics event data, the CPU 1 determines a "Yes" answer at step s6 and determines at step s10 whether a line change flag is set as "1" or not. The line change flag is used to represent transfer of a line to the following new line in display of the words of a song.

In this embodiment, the display circuit 11 designed to display the words of a song on a line so that the designated words are deleted after vocal performance thereof to display the following words of the song on the next line. Accordingly, if the line-change flag is set as "1", the CPU 1 deletes the currently indicated words in a line at step s11 and extracts at step s12 all the lyrics event data until applied with the next line-change code to produce new words on the next line. In turn, the CPU 1 applies the new words on the next line to the display circuit and resets the line-change flag. Thus, the new words on the next line is displayed. Since the line-change code is included in the lyrics event data of words to be changed, the CPU 1 changes the line change flag to "1" when applied with the line-change code. That is to say, when the line-change code code is included in the lyrics event data at step s13, the CPU 1 sets the line-change flag to "1" at step s14. The line change flag is checked at step s10 to renew display of the word on the line when the next lyrics event is read out. At step s15, the CPU 1 determines whether a wipe flag is "0" or not. If the answer at step s15 is "Yes", the CPU 1 sets the wipe flag to "1" at step s16. If the wipe flag is "0" at step s15, the CPU 1 determines a "No" answer and changes all the unchanged part of the background color at step s17.

Hereinafter, wipe processing of the background color of the song words will be described with reference to FIG. 6.

The wipe processing is executed by the CPU 1 in response to an interruption signal applied from the timer 5 upon each lapse of 20 ms. At step s21 of FIG. 6, the CPU 1 determines whether the wipe flag is set as "1" or not. If the answer at step s21 is "Yes", the CPU 1 changes the background color of the word in a predetermined width at step s22 and resets the wipe flag to "0" at step s24 when the background color of the word has been changed until the end. In other words, when the lyrics event data is read out, the wipe flag is set as "1" at step s16 of FIG. 5, and the background color is changed in the predetermined width by processing at step s22 upon each lapse of 20 ms. When the end of the word has been wiped, the wipe flag is reset at step s24 to stop the wipe processing until the next lyrics event data is read out. In the case that the note corresponding with the word being wiped is short, the next lyrics event data is read out before the word is completely wiped. Since in this instance, the next lyrics event data is read out before the wipe flag is reset, the CPU 1 determines a "No" answer at step s15 to immediately change the unchanged part of the background color being wiped.

It is desirable that the width of the background color changed once by the wipe processing is determined on a basis of an average note length of the song words. For example, in the case that a melody of a piece of music is comprised of the length of an eighth note, it is desirable that wipe of the words is finished in a period of time of the eighth note. Assuming that the time length of the eighth note is 250 ms under tempo of 120, the background color is changed in a word width of $\frac{1}{12.5}$ for smooth wipe upon each lapse of 20 ms. When the width for change of the background color is changed in accordance with the tempo by wipe processing, the wipe of the words is advanced more smoothly. Alternatively, the execution frequency of wipe processing may be changed in a constant width. The wipe speed may be changed in accordance with a time interval until the following lyrics event data to more smoothly change the background color without casing a sudden change of the background color.

When finished execution of the program shown in FIG. 5, the CPU 1 returns the program to step s4 where the CPU 1 advances the address of the performance data and reads out the following data. Since a time data is memorized in the following event data, the CPU 1 determines a "Yes" answer at step s5 and adds the time data to the register TIME at step s8. If the value of the register TIME becomes a positive value as a result of addition of the time data, the CPU 1 finishes execution of the reproduction processing and returns the program to the main routine. If the performance event data and lyrics event data continue or if there is a performance event data corresponding with a chord, the time data becomes "0" or a value of approximately "0", in such a case, the CPU 1 determines a "No" answer at step s9 and repeats processing at step s4–s9.

Hereinafter, a second embodiment of the present invention will be described with reference to FIGS. 7 to 13 and FIG. 16. In this embodiment, the automatic performance apparatus in the first embodiment further is provided with a software sound source for forming a musical tone waveform by processing of a software. In operation, either the sound source circuit 12 in the form of a hardware or the software sound source is selectively utilized to produce accompaniment tones for the Karaoke system. In this case, the sound source circuit 12 may be detachably installed on the automatic performance apparatus.

The software sound source as well as the sound source circuit 12 is in the form of a conventional waveform memory system, a frequency modulation system, a physical mode simulation system, a higher harmonic synthesis system, a formant synthesis system or the like. In the software sound source, a musical tone waveform data is produced at a predetermined frequency, for instance, 10 ms and stored in a waveform buffer. The musical waveform data is read out from the waveform buffer at a predetermined time interval as in the sound source circuit 12.

In the case that the CPU 1 acts to produce the musical waveform by processing of the software, to read out the performance data of the Karaoke system and to execute processing for display of the lyrics, the ability of the CPU 1 is insufficient. In such an instance, the production of the musical tone waveform delays, the sound of the performance data breaks off or the readout of the performance data or the display of the lyrics delays. To avoid such problems, the wipe processing for display of the lyrics is abbreviated when the musical tone waveform is produced by processing of the software. If in the first embodiment the wipe processing is prohibited to coincide the progress position of the performance with the position of the lyrics, the background color of the words is changed. This is effective to reduce the load of the CPU 1 so as to avoid the problems described above.

Although the processing for producing the musical tone waveform is executed at a priority order as higher as possible, the formation of the musical tone waveform will be delayed if the CPU 1 executes the other processing at a more higher priority order. To avoid such a problem in this embodiment, a buffer is provided to store the musical tone waveform produced in a predetermined period of time (for instance, 400 ms) so that the musical waveform can be read out therefrom without any interruption even if the processing for formation of the waveform is delayed.

In case the formation of the musical tone waveform is started in the occurrence of the performance event, the CPU 1 starts to read out the musical tone waveform after it has been stored in the buffer within the time period of 400 ms. In such an instance, the actual sound timing of the musical waveform is delayed with the time period of 400 ms in the occurrence of the performance event. For this reason, in the case that the musical waveform is produced by processing of the software, the CPU 1 is programmed to delay the display timing of the lyrics with the time period of 400 ms in the occurrence of the lyrics event. This is useful to eliminate a time lag between the display timing of the lyrics and the sound timing of the musical tone waveform.

Figure 7:
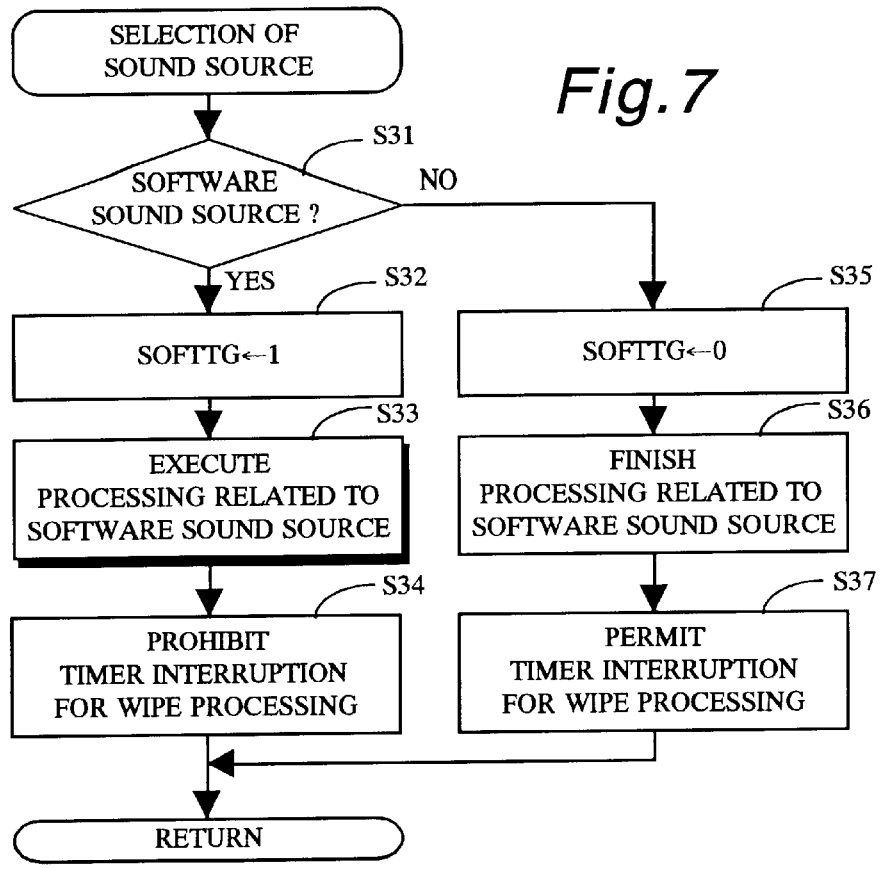
FIG. 7 is a flow chart of a program for selection of sound sources in a second embodiment of the present invention.
Figure 8:
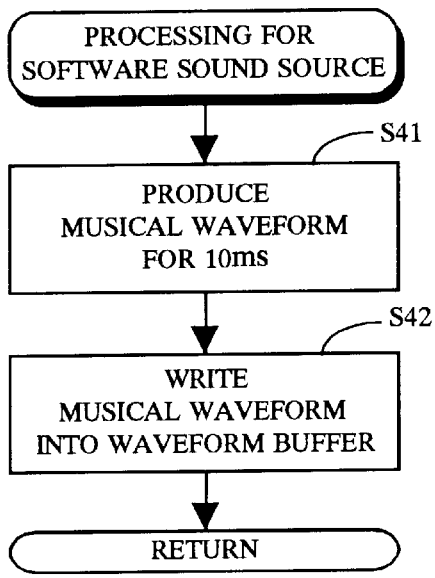
FIG. 8 is a flow chart of a program for processing of a software sound source in the second embodiment.

In FIG. 7 there is illustrated a program for selection of the sound source which is executed by the CPU 1 when either one of the sound sources is selected by operation of the operation element 10 such as the keyboard or the mouse. In this embodiment, a sound source selection window is displayed in the display circuit 11, and a selection switch on the selection window is operated by the operation element 10 to initiate execution of the program for selection of the sound source. At step s31, the CPU 1 determines whether the software sound source has been selected or not. If the answer at step s31 is "Yes", the CPU 1 sets at step s32 a flag SOFTTG indicative of selection of the software sound source as "1" and starts at step s33 to execute an interruption program for processing of the software sound source shown in FIG. 8 and a program for initial processing of a musical tone waveform shown in FIG. 9.

The program for processing of the software sound source is executed by the CPU 1 in response to an interruption signal applied from the timer 5 upon each lapse of 10 ms. At step s41, the CPU 1 produces a musical tone waveform data for 10 ms on a basis of the contents of a sound register. The software sound source includes a plurality of musical tone waveform production channels for simultaneously producing a plurality of musical tone waveforms. The sound register is in the form of a register which corresponds with the musical waveform production channels to store a performance event for determining a musical should to be selectively generated at the production channels. At step s42, the CPU 1 stores the musical waveform data in the waveform buffer thereby to accumulate the musical tone wave form data therein.

Figure 9:
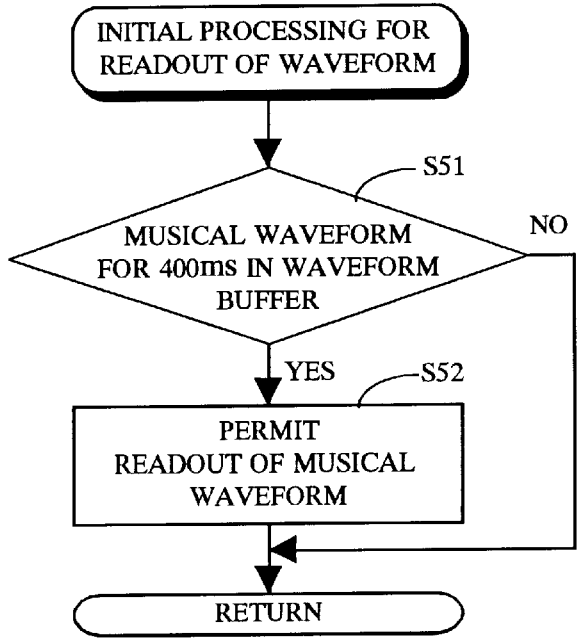
FIG. 9 is a flow chart of a program for initial processing of a musical tone waveform in the second embodiment.

During execution of the program for initial processing of the musical tone waveform shown in FIG. 9, the CPU 1 determines at step s51 whether the musical tone waveform data for 400 ms has been stored in the waveform buffer or not. If the answer at step s51 is "Yes", the CPU 1 executes at step s52 readout processing of the musical waveform data. During execution of the readout processing, the CPU 1 successively reads out the musical tone waveform data from the waveform buffer at each lapse of a predetermined period of time corresponding with a sampling frequency of the musical tone waveform data. If the answer at step s51 is "No", the readout processing of the musical waveform data is prohibited until the musical waveform data for 400 ms is stored in the waveform buffer.

When the program returns to the program of FIG. 7, the CPU 1 prohibits at step s34 execution of the interruption program for wipe processing and sets the wipe flag as "1". Thus, when the software sound source has been selected, the execution of the wipe processing is prohibited, and the background color of the lyric is changed once for each one word. When the hardware sound source has been selected, the CPU 1 sets at step s35 the flag SOFTTG as "0", finishes at step s36 the processing related to the software sound source and permits at step s37 execution of the interruption program for the wipe processing. Thus, the background color of the lyrics is gradually changed for one word.

Figure 10:
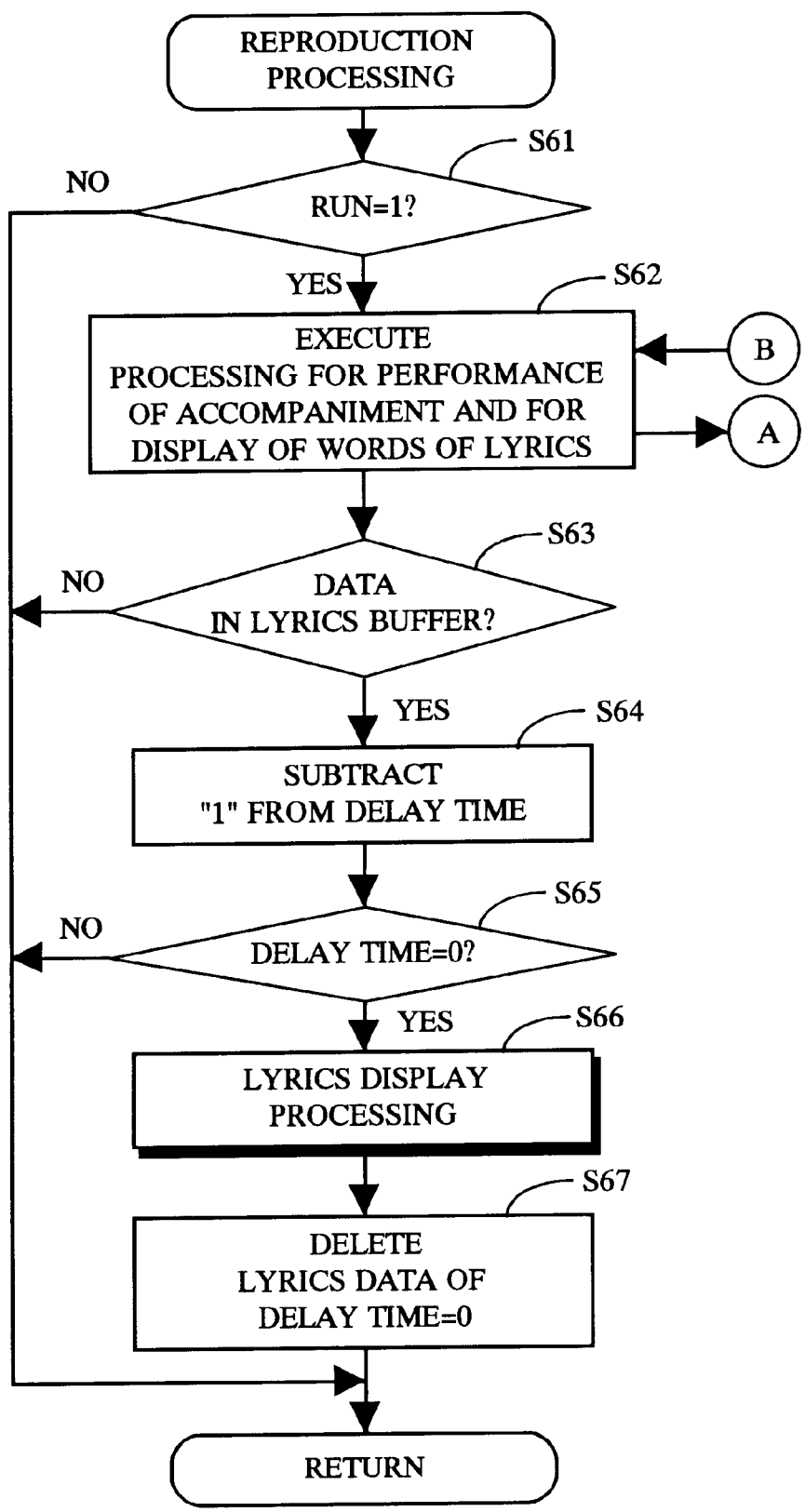
FIG. 10 is a flow chart of the first part of a program for reproduction processing in the second embodiment.

In FIG. 10 there is illustrated a program for reproduction processing in the second embodiment which is executed by the CPU 1 in stead of the programs shown in FIGS. 4 and 5. The program for reproduction processing is executed by the CPU 1 in response to an interruption signal applied from the timer 5 upon each lapse of 10 ms. When the flag RUN is set as "1", the CPU 1 determines a "Yes" answer at step s61 and executes at step s62 processing for performance of the accompaniment of the Karaoke and for display of the words of a song as shown in FIG. 4. When determined a "No" answer at step s61, the CPU 1 determines at step s68 whether the read out data is a lyrics event data or not. If the answer at step s68 is "Yes", the CPU 1 determines at step s69 whether the flag SOFTTG indicative of selection of the software sound source is "0" or not. If the answer at step s69 is "No", the CPU 1 applies a performance event to the sound source circuit 12 to sound or mute the performance of the accompaniment. If the answer at step s69 is "No", the CPU 1 writes the performance event data into the sound register to form a musical tone waveform by processing of the software shown in FIG. 8.

Figure 13:
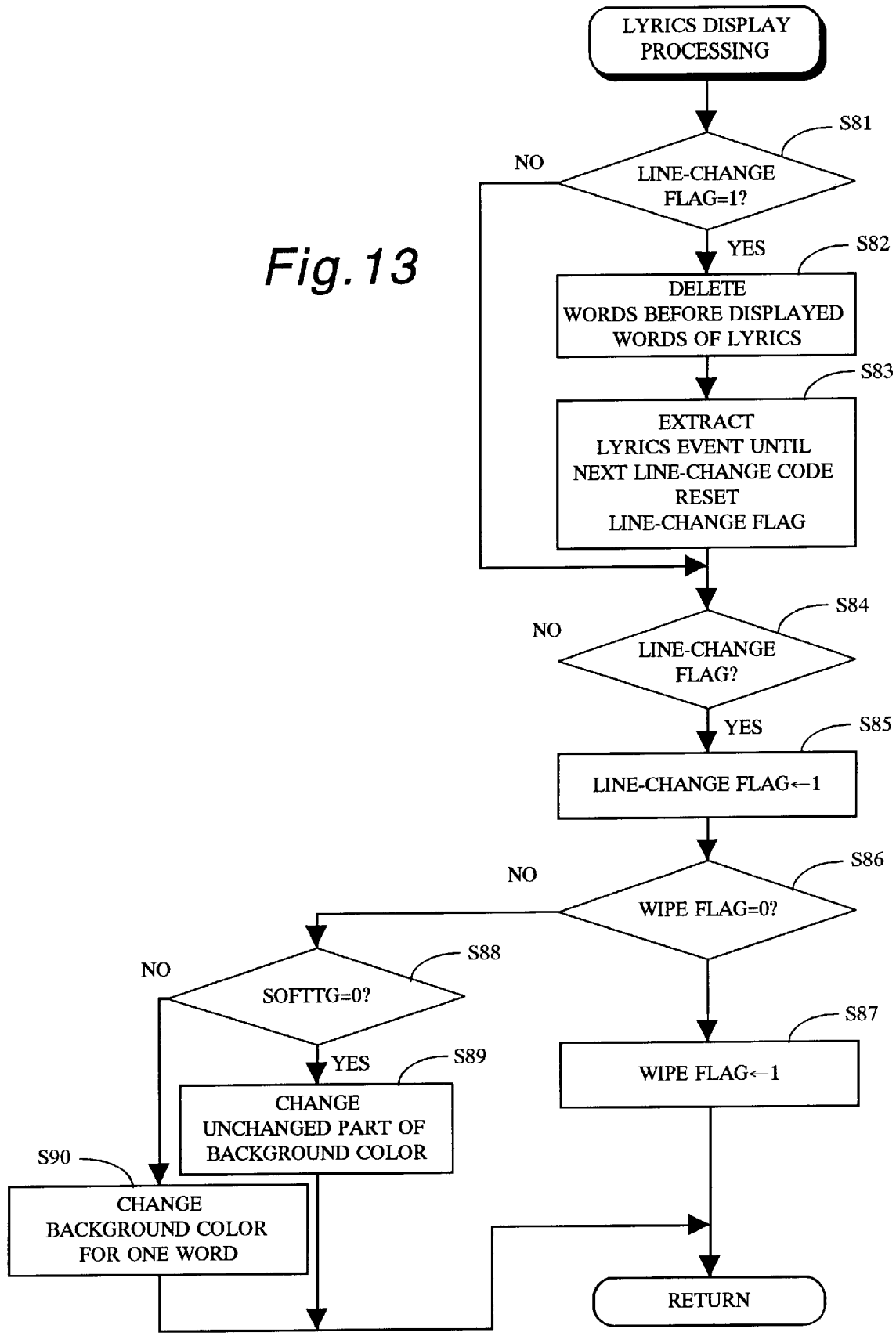
FIG. 13 is a flow chart of a program for lyrics display processing in the second embodiment.

If the answer at step s68 is "Yes", the CPU 1 determines at step s72 whether the flag SOFTTG indicative of selection of the software sound source is "0" or not. If the software sound source is selected, the CPU 1 determines a "Yes" answer at step s72 and executes at step s73 processing for display of the lyrics as shown in detail in FIG. 13. Processing at step s81 to s87 in FIG. 13 is the same as the processing at step s10 to s16 in FIG. 5. When determined a "No" answer at step s86, the CPU 1 determines at step s88 whether the flag SOFTTG is "0" or not. If the software sound source is not selected, the CPU 1 determines a "No" answer at step s88 and changes at step s89 all the unchanged part of the background color being wiped. If the answer at step s88 is "Yes", the CPU 1 changes at step s90 all the background color of one word. Thus, the background color of the lyric is changed at once. In addition, if the software sound source has been selected, the wipe flag is set as "1" at step s34 of FIG. 7 to prohibit the wipe processing. As a result, the background color of one word is always changed at once.

Figures 11, 12:
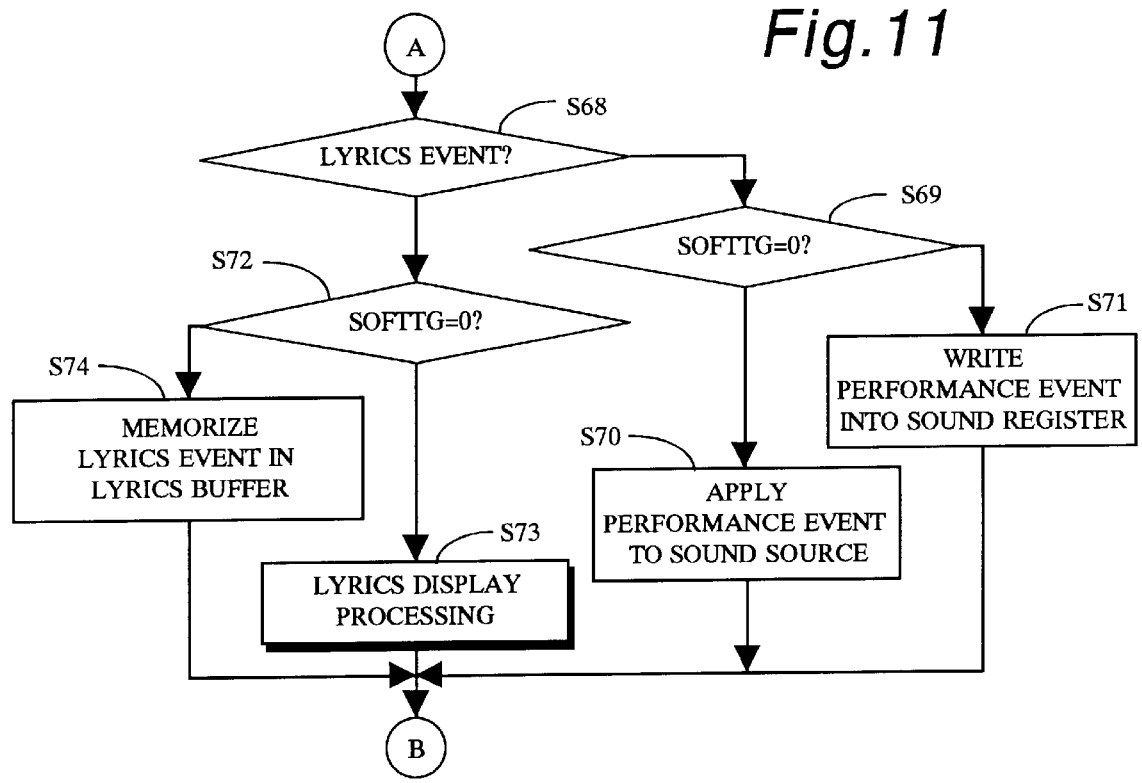
FIG. 11 is a flow chart of the second part of the program for reproduction processing.
FIG. 12 is a view illustrating a lyrics buffer in the second embodiment.

If the software sound source has been selected, the CPU 1 determines a "No" answer at step s72 and memorizes at step s74 the lyrics event data and a delay time=40 in a lyric buffer. As shown in FIG. 12, the lyrics buffer has memory regions for memorizing the lyrics event data and the delay time. The delay time memorized in the lyrics buffer is decreased by processing at step s64 of FIG. 10. When the delay time becomes "0". the CPU 1 executes the processing for display of the lyrics shown in FIG. 13. Since the initial value "40" is set as the delay time while the reproduction processing of FIG. 10 is executed upon each lapse of 10 ms, the delay time becomes "0" after lapse of a time defined by 10 ms×40=400 ms. This means that the delay time of 400 ms corresponds with the time lag between the occurrence of the performance event and the readout timing of the musical tone waveform. The generation timing of the lyrics event is delayed with the same time as the delay time 400 ms. When finished the processing of FIG. 11, the CPU 1 returns the program to step s62 of FIG. 10.

After processing at step s62, the CPU 1 determines at step s63 whether any data is memorized in the lyrics buffer or not. If the answer at step s63 is "Yes", the CPU 1 subtracts "1" from the delay time at step s64 and determines at step s65 whether the delay time is "0" or not. When the delay time becomes "0", the CPU 1 determines a "Yes" answer at step s65 and executes at step s66 the processing for display of the lyrics shown in FIG. 13. Thereafter, the CPU 1 eliminates at step s67 the lyric data from the lyrics buffer.

With the foregoing processing, the background color of the words of a song gradually changes as shown in FIG. 16(A) when the hardware sound source has been selected, and the background color of one of the words changes at once as shown in FIG. 16(B) when the software sound source has been selected.

Hereinafter, a third embodiment of the present invention will be described with reference to FIGS. 14 to 16. In this embodiment, the smoothness of the wipe processing is changed in accordance with selection of the sound source. Although in this embodiment the reproduction processing shown in FIGS. 10 and 11 and the processing for display of the lyrics are executed in the same manner as in the second embodiment, the processing at step s88 and s90 shown in FIG. 13 is eliminated.

Figure 14:
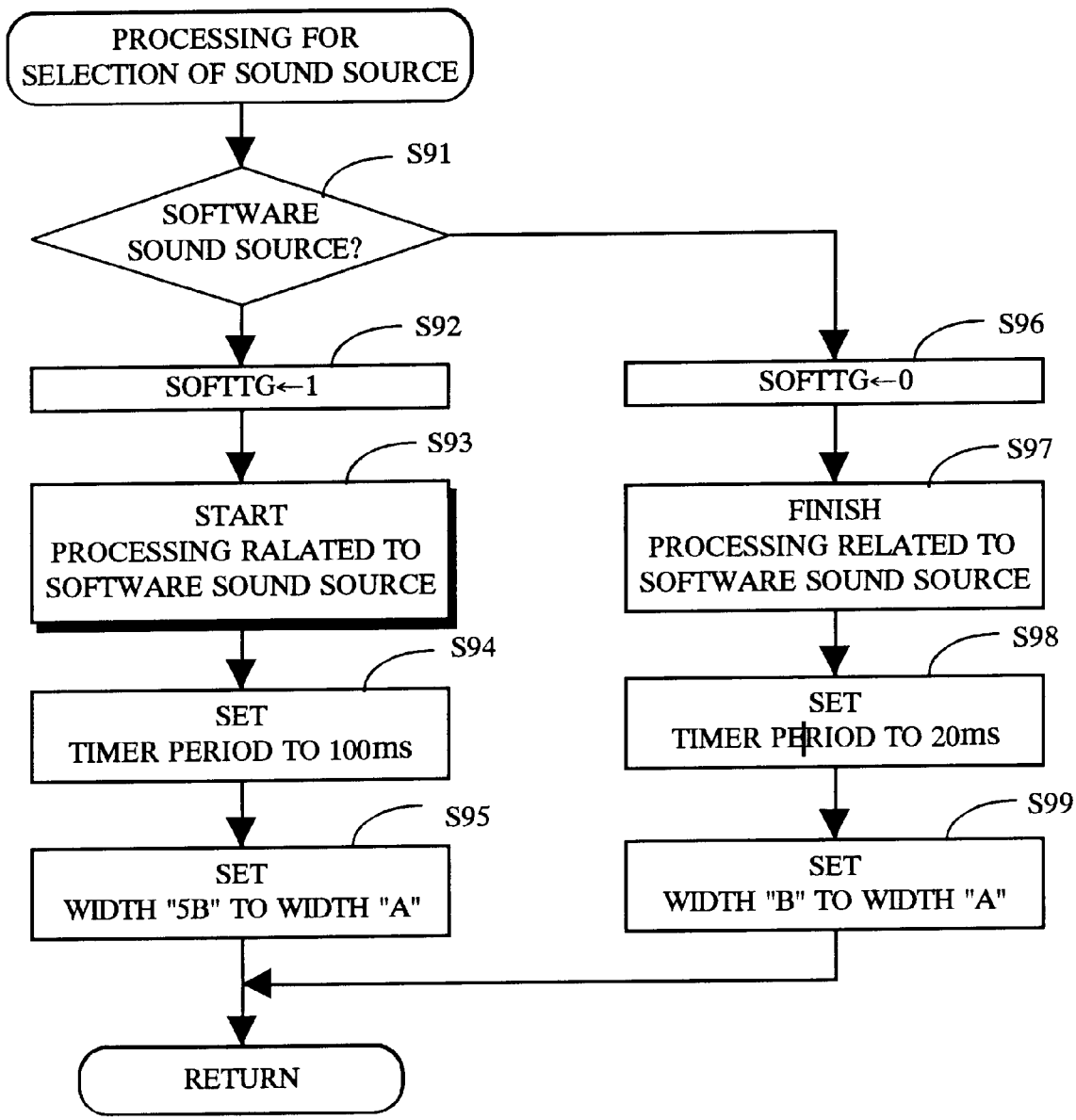
FIG. 14 is a flow chart of a program for selection of sound sources in a third embodiment of the present invention.

In FIG. 14 there is illustrated a program for selection of the sound source which is executed by the CPU 1 when either one of the sound sources is selected by operation of the operation element 10 such as the keyboard or the mouse. At step s91, the CPU 1 determines whether the software sound source has been selected or not. If the answer at step s91 is "Yes". the CPU 1 sets at step s92 the flag SOFTTG indicative of selection of the software as "1" and starts at step s93 to execute the processing related to the software sound source in the same manner as the processing shown in FIGS. 8 and 9. After processing at step s93, the CPU 1 sets at step s94 a timer interruption period for wipe processing as 100 ms and sets at step s95 a width 5B (=five times the width B) as a predetermined width A for changing the background color by once wipe processing. If the hardware sound source has been selected, the CPU 1 determines a "No" answer at step s91 and sets at step s96 the flag SOFTTG as "0". In this instance, the CPU 1 finishes at step s97 the processing related to the software sound source, sets at step s98 the timer interruption period for wipe processing as 20 ms, and sets at step s99 the width B as the predetermined width A.

Although the width of the background color changed in the time period 100 ms is the width of 5B, the width of 5B in selection of the hardware sound source is divided to change the background color five times thereby to more smoothly change the background color. When the software sound source has been selected, the frequency of wipe processing is reduced to decrease the load of the CPU 1 for processing of the software sound source.

Figure 15:
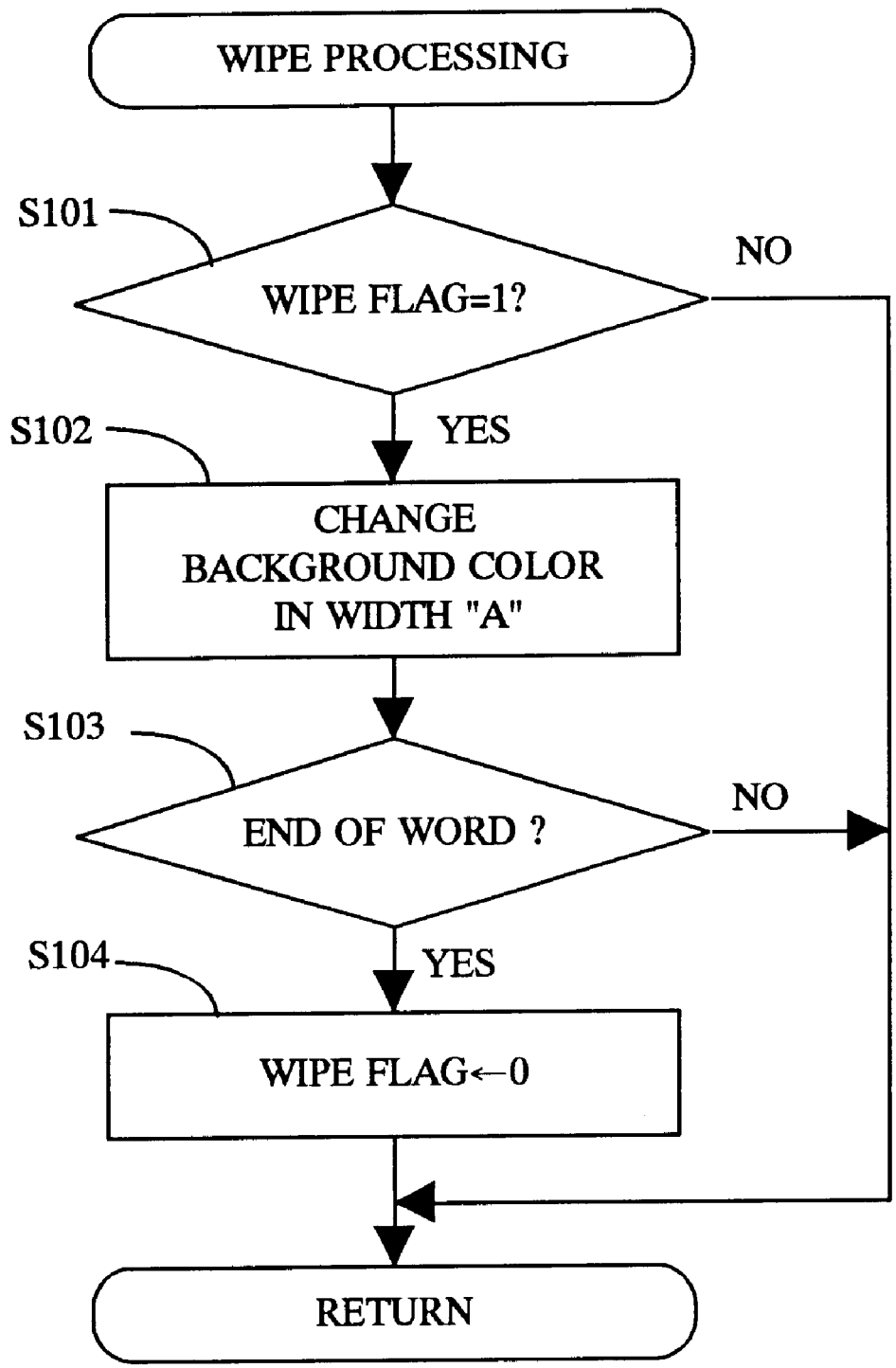
FIG. 15 is a flow chart of a program for wipe processing in the third embodiment.

In FIG. 15 there is illustrated a program for wipe processing which is executed at the timer interruption frequency set by processing at step s94 or s98. At step s101, the CPU 1 determines whether the wipe flag has been set or not. If the answer at step s10 is "Yes", the CPU 1 changes at step s102 the background color of the word only in the predetermined width A and determines at step s103 whether the background color has change at the end of the word or not. When determined a "Yes" answer at step s103, the CPU 1 resets the wipe flag at step s24 shown in FIG. 6.

With the foregoing processing, the background color of the song words smoothly changes in a small width as shown in FIG. 16(A) when the hardware sound source has been selected, while the background color of the song words changes in a large width as shown in FIG. 16(C) when the software sound source has been selected.

Although in the second and third embodiments, the wipe method of the background color of the song words has been changed in accordance with selection of the hardware sound source and the softwar sound source for adjustment of the load acting on the CPU 1, the wipe method of the background color of the song words may be varied in the processing ability of the CPU 1. In such a case, the processing ability of the CPU is measured by determination of the CPU code. When the processing ability of the CPU is high, the wipe of the background color is made smooth. When the processing ability of the CPU is low, the wipe of the background color is made coarse or abbrevated. In addition, the wipe method of the background color may be varied taking into account the processing ability of the CPU and a selected condition of the hardware or software sound source. In the case that the readout of the performance data and processing other than the processing for display of the song words are carried out at the same time, it is preferable that the wipe method of the background color is changed in accordance with the load acting on the CPU.

In practical embodiments, the present invention can be adapted to an electronic musical instrument, a Karaoke apparatus, a personal computer associated with an application software or the like. The lyrics data may be memorized in the form of the word data of a song and a production timing of each word. The display of the words of a song may be simultaneously indicated on a plurality of lines, and the words of a song may be displayed prior to the current progress position of the performance in one or plural lines. The tempo of the performance may be modified by change of the period of the reproduction processing or the time data. Only the lyrics data may be memorized to display only the words of a song in response to a progression of a piece of music. The readout start timing of the lyrics data may be delayed with a predetermined time to coincide the production timing of the musical tone with the display timing of the progress position of the song words.

What is claimed is:

1. A lyrics display apparatus, comprising:
   memory means for memorizing the words of a song and a production timing data of each of the song words;
   display means for displaying the words of the memorized song thereon;
   wipe means for gradually changing a display condition of the song words on said display means in accordance with a progression of a piece of music; and
   means for starting change of the display condition of the song words on a basis of the production timing data and for changing the display condition of the song word in a predetermined amount at a predetermined time interval.

2. A lyrics display apparatus as claimed in claim 1, wherein said wipe means comprises means for changing the display condition of the song words in an unchanged part at a timing defined by the production timing data of the following word while the display condition being changed.

3. A lyrics display apparatus, comprising:
   memory means for memorizing the words of a song and a production timing data of each of the song words;
   display means for displaying the words of the memorized song thereon;
   processing means for control of the production timing data of each of the song words;
   wipe means for changing the display condition of the song words on said display means in accordance with a progression of a piece of music at a timing defined by the production timing data under control of said processing means; and
   control means for controlling a change of the display condition of the song words on said display means in accordance with the processing ability of said processing means.

4. A lyrics display apparatus, comprising:
   memory means for memorizing the words of a song, a production timing data of each of the song words and a performance data corresponding with the production timing;
   display means for displaying the words of the memorized song thereon;
   musical tone production means for producing a musical tone waveform signal based on the memorized performance data;
   indication means for indicating a progress position of the song words displayed on said display means based on each production timing data of the song word; and
   delay means for delaying the indication of the progress position of the song words with a predetermined period of time corresponding with a time required for the production of the musical tone waveform signal.

5. A method of displaying the words of a song on a display device, comprising the steps of:
   memorizing the song words and a production timing data of each of the song words;
   displaying the words of the memorized song on said display device;
   gradually changing a display condition of the song words on said display device in accordance with a progression of a piece of music; and
   starting change of the display condition of the song words on a basis of the memorized production timing data and for changing the display condition of the song word in a predetermined amount at a predetermined time interval.

6. A method of displaying the words of a song on a display device, comprising the steps of:
   memorizing the words of the song and a production timing data of each of the song words;
   displaying the words of the memorized song on said display device;
   changing the display condition of the song words on said display device in accordance with a progression of a piece of music at a timing defined by the controlled production timing data; and
   controlling a change of the display condition of the song words on said display device in accordance with the processing ability of processing meals for control of the memorized production timing of each of the song words.

7. A method of displaying the words of a song on a display device, comprising the steps of:
   memorizing the words of the song, a production timing data of each of the song words and a performance data corresponding with the production timing:
   displaying the words of the memorized song on said display device;
   producing a musical tone waveform signal based on the memorized performance data;
   indicating a progress position of the song words on said display device based on each production timing data of the song words; and
   delaying the indication of the progress position of the song words with a predetermined period of time corresponding with a time required for the production of the musical tone waveform signal.

8. A machine readable media programmed to execute the steps of:
   memorizing the words of a song and a production timing data of each of the song words;
   displaying the words of the memorized song on a display device;
   gradually changing a display condition of the song words on the display device in accordance with a progression of a piece of music; and
   starting change of the display condition of the song words on a basis of the production timing data and for changing the display condition of the song word in a predetermined amount at a predetermined time interval.

9. A machine readable media programmed to execute the steps of:
   memorizing the words, of a song and a production timing data of each of the song words;
   displaying the words of the memorized song on a display device;
   changing the display condition of the song words on said display device in accordance with a progression of a piece of music at a timing defined by the memorized production timing data; and
   controlling a change of the display condition of the song words on said display device in accordance with the processing ability of processing means for control of the memorized production timing of each of the song words.

10. A machine readable media programmed to execute the steps of:

memorizing the words of a song, a production timing data of each of the song words and a performance data corresponding with the production timing;

displaying the words of the memorized song on a display device;

producing a musical tone waveform signal based on the memorized performance data;

indicating a progress position of the song words displayed on said display device based on each production timing data of the song words; and delaying the indication of the progress position of the song words with a predetermined period of time corresponding with a time required for the production of the musical tone waveform signal.

* * * * *